Dec. 9, 1958  E. K. NELSON ET AL  2,863,646
DISTRIBUTOR TROUGH FOR MILK HOLDING VATS
Filed June 24, 1955  3 Sheets-Sheet 1
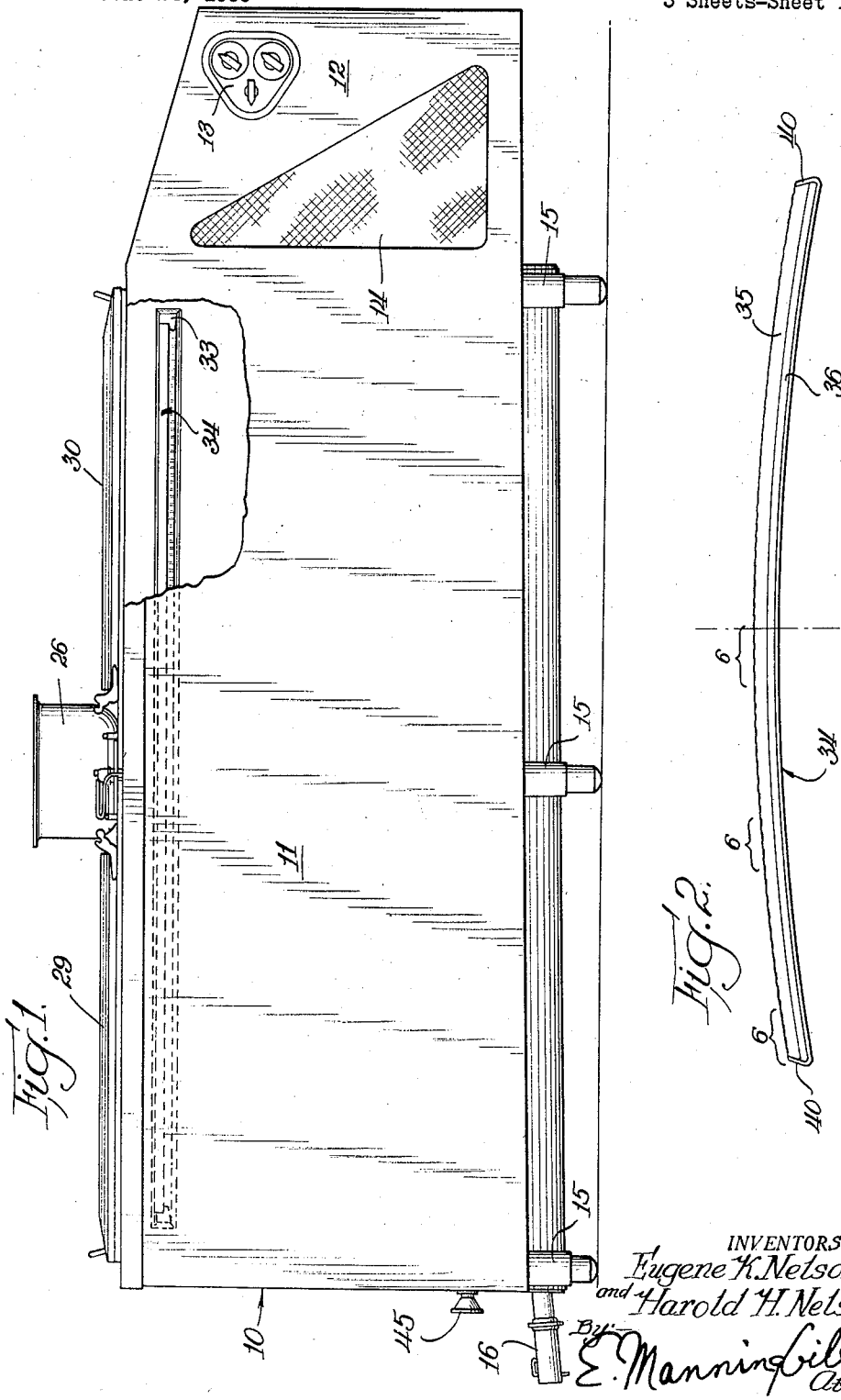
INVENTORS:
Eugene K. Nelson
and Harold H. Nelson
By
E. Manning Giles
Att'y

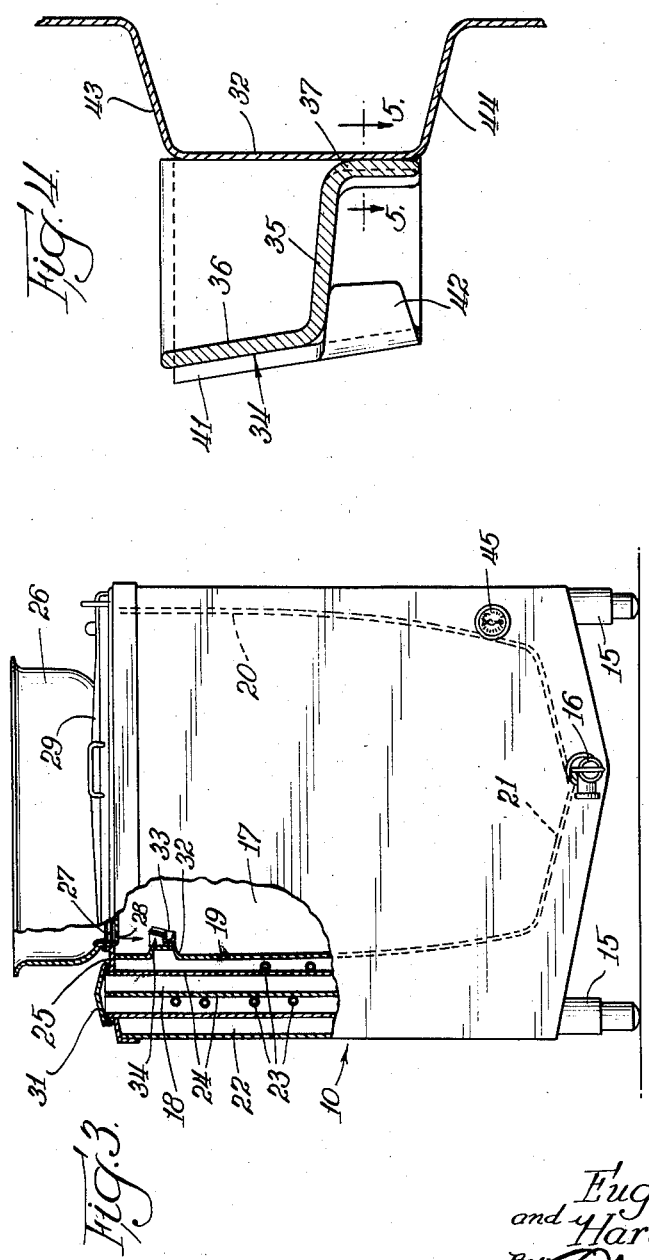

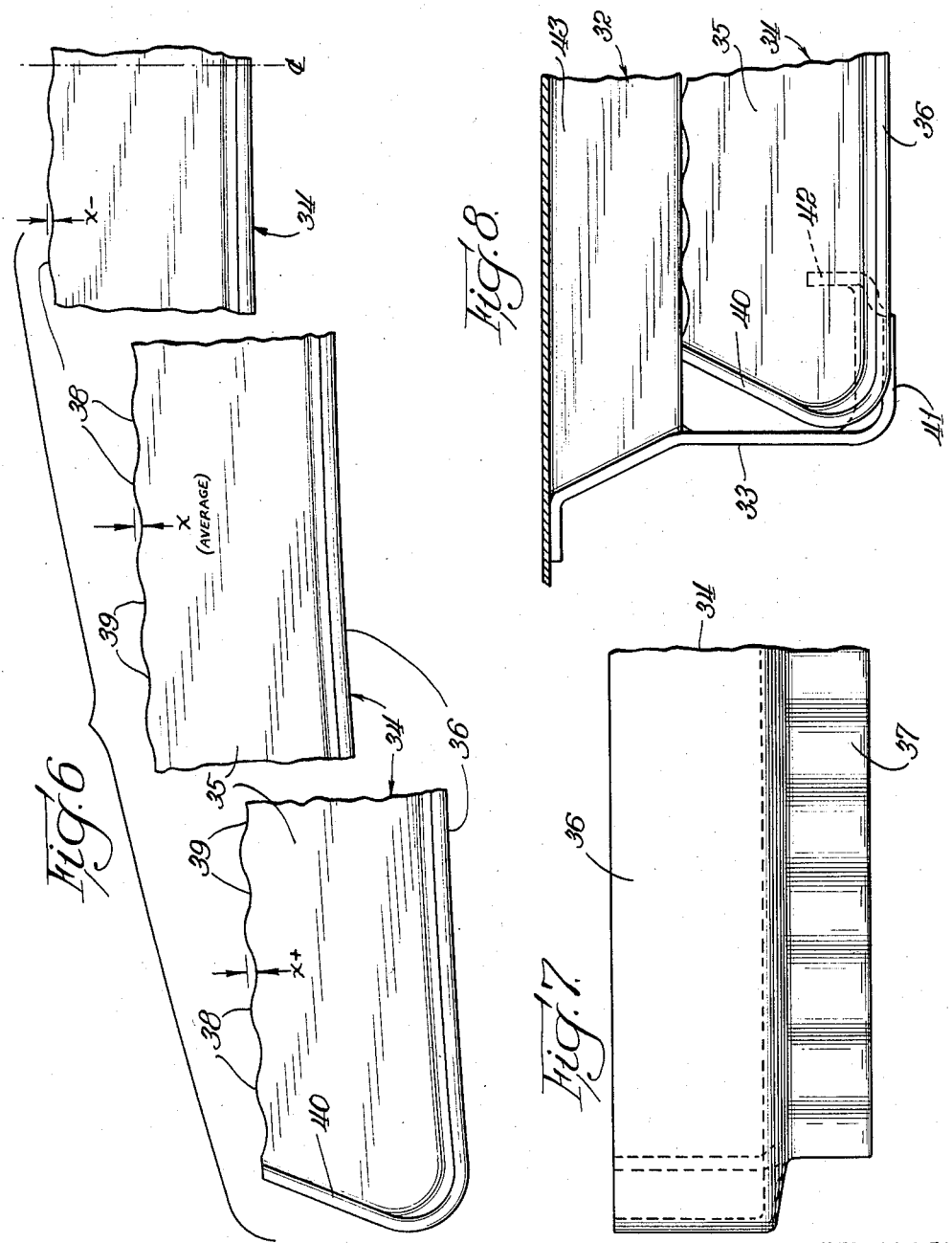

United States Patent Office 2,863,646
Patented Dec. 9, 1958

2,863,646

DISTRIBUTOR TROUGH FOR MILK HOLDING VATS

Eugene K. Nelson and Harold H. Nelson, Cedar Rapids, Iowa, assignors to Cherry-Burrell Corporation, Chicago, Ill., a corporation of Delaware Application June 24, 1955, Serial No. 517,804

6 Claims. (Cl. 257—190)

Our invention relates to a distributor trough for milk holding vats and has reference more particularly to facilities for causing a thin, uniform film of milk or other liquid to flow down the cold wall of a refrigerated storage tank.

Tanks of this character are used on dairy farms for receiving and holding milk from the time the cattle are milked until the milk is collected for processing at a dairy.

In the past, dairy farmers collected milk in milk cans which were used to hold the milk until a sufficient quantity was accumulated to deliver to the dairy. The cans were then loaded on a truck and taken to the dairy plant. This procedure was objectionable because of all the handling involved, the lifting of heavy milk cans, the difficulty of keeping such cans of milk properly refrigerated, and the problem of keeping the cans clean and free of contamination.

A trend has developed in favor of bulk handling of milk at the dairy farm, and for this purpose it has been necessary to develop special milk holding vats. These vats must chill the milk, as it is received, from animal temperature down to about 40° F. and to hold the milk at that temperature until collected by a tank truck sent out by the dairy. Such milk is usually collected every-other-day, and it is therefore desirable to chill the milk as rapidly as possible to the desired temperature so as to keep the milk in good condition and to inhibit bacterial activity.

It is a principal object of our invention to design a milk distributor trough for a milk holding vat which will cause a thin, uniform film of milk to flow down a chilled wall of the vat as it is supplied thereto so as to assure rapid cooling of the milk.

It is another object of our invention to provide such a trough which is quickly removable for cleaning and easily reinstalled in the vat.

It is a further object of our invention to make such a trough of sanitary design, to contour the trough in such a manner as to facilitate cleaning, and to avoid any angles or corners from which it would be difficult to remove accumulation of milk or scum.

Further objects of our invention include devising a distributor trough which will bear uniformly against a wall of the vat, eliminating the necessity for intermediate supports, and assuring uniform depth of milk flowing from said trough throughout its length, these and other objects being accomplished as hereinafter described, reference being had to the accompanying drawing in which—

Fig. 1 is a side view of a milk holding vat with a portion broken away to show the distributor trough of our invention installed in the vat;

Fig. 2 is a top view of the distributor trough when removed from the vat showing its normally bowed form;

Fig. 3 is an end view of the vat of Fig. 1 with a portion broken away to show the distributor trough and the vat cooling facilities;

Fig. 4 is an enlarged sectional view of the distributor trough mounted in the vat;

Fig. 5 is a view on the line 5—5 of Fig. 4;

Fig. 6 is an enlarged view of the portions of Fig. 2 indicated by brackets 6;

Fig. 7 is a back view of an end of the distributor trough; and

Fig. 8 is a top view of the same end of the distributor trough showing it mounted in the vat.

Referring now to the drawing, the milk holding vat to which my invention relates is designated generally by the reference numeral 10 and has a main body portion 11 with an accessory housing 12 at one end thereof to enclose the refrigeration facilities and the like. A control panel 13 is mounted on the side of the accessory housing 12 and is provided with controls used to regulate the operation of the equipment. A vent 14 in the side of the accessory housing 12 permits air to circulate to the facilities mounted therein.

The vat 10 is provided with adjustable legs 15 which permit mounting said vat 10 in a level position on any floor, regardless of irregularities or slope. An outlet valve 16 is installed at one end of the vat 10 and is used for removing milk therefrom and also for drainage when the vat 10 is flushed out for cleaning.

The interior of the main body portion 11 of the vat 10 is divided into a rectangular milk compartment 17 and a longitudinal cooling chamber 18 along one side thereof. The milk compartment 17 is formed by side walls 19 and 20 and a V-shaped floor 21 with end walls (not shown). Preferably, said walls and floor are fabricated of stainless steel with rounded corners to facilitate cleaning said milk compartment 17.

The longitudinal cooling chamber 18 is separated from the milk compartment 17 by the side wall 19 and has an insulated wall 22 at the other side. Cooling coils 23 are mounted in said cooling chamber 18 on vertical supports 24, the coils 23 being connected to a source of refrigerant (not shown) in the accessory housing 12. When the vat 10 is in use, the cooling chamber 18 is filled with water. As coolant is circulated through the coils 23, ice forms on them. As heat is transferred through the side wall 19, the water is kept chilled by the melting of ice on said coils 23.

A bridge 25 is mounted laterally across the top of the vat 10 at about the middle of the milk compartment 17, a central opening being provided in said bridge 25 to receive a bowl 26. The bowl 26 has a filter 27 resting on the bottom and an outlet orifice 28 in the bottom of said bowl 26 adjacent the side wall 19 of the milk compartment 17.

Covers 29 and 30 are provided for the milk compartment 17, one at each side of the bridge 25. These serve to protect the contents from contamination by dust or other foreign matter which might otherwise get into the milk comparment 17. Also, an elongated cover 31 is provided over the cooling chamber 18.

A longitudinal projection 32 is formed in the side wall 19 near its top edge protruding into the milk compartment 17 and extending substantially the entire length thereof. Brackets 33 are placed at each end of said projection 32 and a distributor trough 34 which is of the same length as the distance between the brackets 33 is mounted therein at its respective ends in juxtaposed relation with respect to the projection 32.

The trough 34 is formed with a floor 35, an upstanding back flange 36 along one edge thereof, and a skirt 37 along the other edge thereof. The skirt 37 is relatively undulated in form so as to provide humps 38 and recesses 39. The humps 38 of said skirt 37 are adapted to bear against the lower portion of the longitudinal projection 32 throughout the entire length of the trough 34 when said trough 34 is mounted in the brackets 33. In order to insure proper engagement throughout the entire length thereof, the trough 34 is bowed about three (3) inches as shown in Fig. 2 with the undulated skirt 37 being the convex side. Thus when the trough 34 is mounted in the brackets 33, the trough 34 is flattened against the longitudinal projection 32 and the humps 38 are thus maintained in firm contact with the projections 32.

The distributor trough 34 and the longitudinal projection 32 form a channel to receive milk from the bowl 26, the outlet orifice 28 of said bowl 26 being disposed over said channel so that milk poured into said bowl 26 passes through the filter 27 and flows through the outlet orifice 28 to the aforesaid channel. In order to prevent the milk flow from splashing out of the trough 34, the top of the back flange 36 thereof is curved toward the projection 32 as shown by the dotted lines 36a in Fig. 4 at the mid point of the trough 34 under the bridge 25.

The recesses 39 are preferably of varying depth, the average depth being approximately eight thousandths (.008) of an inch as shown at "X" in Fig. 6. Toward the center of the trough 34 where the milk builds up greater depth and thus maximum pressure, the recesses 39 may be shallower such as five thousandths (.005) of an inch, as indicated by "X—" in Fig. 6. At the extremities of the trough 34, where there is minimum milk pressure, the recesses 39 are deepened to compensate such as to a depth of eleven thousandths (.011) of an inch as indicated by "X+" in Fig. 6. These dimensions are approximate and may be varied considerably, it being the purpose to produce substantially uniform flow of milk throughout the entire length of the trough 34.

At the respective ends of the trough 34, the back flange 36 is bent toward the front of the trough 34 to form end walls 40, the front edge of each end wall 40 coinciding and being aligned with an end hump 38 to provide a straight edge for positioning the trough 34 against the projection 32. The end walls 40 are welded to the trough floor 34 so as to prevent milk overflow at the trough ends, the welding being ground and polished to provide rounded corners.

The brackets 33 may be mounted on the side wall 19 of the vat 10 at the respective ends of the longitudinal projection 32 and may serve as end walls for such longitudinal projection 32 as shown with respect to one end in Fig. 8. The brackets 33 extend outwardly from the projection 32, an end portion 41 of each bracket 33 being turned at right angles to said bracket 33 in the direction of the center of the vat 10. The end portions 41 are spaced from the projection 32 a distance equal to the width of the trough 34 and each end portion 41 has an inturned tab 42 at its lower edge to support the floor 35 of the trough 34 when said trough 34 is mounted in the brackets 33.

The longitudinal projection 32 has a top wall 43 which slopes toward the trough 34 so that any milk that splashes onto said top wall 43 will drain into the trough 34. The bottom wall 44 of the projection 32 slopes downwardly toward the side wall 19 of the vat 10. The milk flowing through the recesses 39 between the trough 34 and the projection 32 passes as separate streams to the bottom wall 44 at the under side of the projection 32. As the milk moves at relatively low velocity adhering to the bottom wall 44, it tends to spread out into a continuous film in which it passes down the side wall 19. Even as the vat 10 fills, the incoming milk tends to continue below the surface of the milk in the vat 10 along said side wall 19, and as it dissipates, the film of milk imparts to the milk in the tank a rolling motion around a longitudinal axis, thus causing the milk to be cooled by contact with the cold wall 19. The trough 34 may, of course, be mounted on a plane-surfaced wall, but we have found both that the milk distributes more evenly by passing along the sloped bottom wall 44 of the projection 32 and the top and bottom walls 43 and 44 reinforce the projection 32 so as to provide a straight unyielding surface against which the skirt 37 of the trough 34 may bear.

An air compressor (not shown) in the accessory housing 12 supplies air which is circulated at predetermined intervals into the cooling chamber 18 to agitate the water therein so that water warmed by heat transfer from the milk through side wall 19 is promptly chilled by contact with the ice on the coils 23. Likewise the air may be circulated by suitable ducts into the milk compartment 17 to agitate the milk therein after said compartment 17 has been partially or completely filled. This serves both to keep the butter fat uniformly distributed throughout the milk and also to cause moving contact of the milk with the cold wall 19.

A temperature indicator 45 is mounted on the outside of the vat 10 to show the temperature of the milk in the milk compartment 17.

While we have described the distributor trough 34 as applied to a particular form of milk holding tank, it is to be understood that the design of the trough, the nature of its mounting, the character of the recesses, and the like may be modified without departing from our invention, the scope of which is to be determined by the appended claims.

We claim:

1. The combination with a tank having a vertical plane-surfaced wall of a liquid distributor adapted to be mounted against said wall, said distributor comprising an elongated shelf-like member having a longitudinal edge adapted to be engaged against said wall to form a trough therewith, said member having a downwardly depending skirt along said longitudinal edge, said skirt being provided with a plurality of closely-spaced relatively-shallow lateral concavities with laterally disposed wall-engaging portions therebetween.

2. The combination with a tank having a vertical plane-surfaced wall of a liquid distributor adapted to be mounted against said wall, said distributor comprising an elongated shelf-like member having a longitudinal edge adapted to be engaged against said wall to form a trough therewith, said member having a downwardly depending skirt along said longitudinal edge, said skirt being provided with a plurality of closely-spaced relatively-shallow lateral concavities with laterally disposed wall-engaging portions therebetween, said concavities and wall-engaging portions being of undulating contour to provide a smooth, easily cleanable surface.

3. The combination with a tank having a vertical plane-surfaced wall of an elongated liquid distributor adapted to be supported at its respective ends in wall-engaging relation to form a trough therewith, said distributor comprising an elongated strip having a depending upstanding flange along one longitudinal edge and a downwardly depending skirt along the other longitudinal edge, said skirt being provided with closely spaced lateral undulations having lateral wall-engaging portions with shallow lateral concavities therebetween.

4. The combination with a tank having a vertical plane-surfaced wall of an elongated liquid distributor adapted to be supported at its respective ends in wall-engaging relation to form a trough therewith, said distributor comprising an elongated strip having a depending upstanding flange along one longitudinal edge and a downwardly depending skirt along the other longitudinal edge, said skirt being provided with closely spaced lateral undulations having lateral wall-engaging portions with shallow lateral concavities therebetween, said distributor being resiliently bowed in a manner to urge said skirt into wall engagement throughout its length when the distributor is supported in wall-engaging relation.

5. The combination with a tank having a vertical plane-surfaced wall of an elongated liquid distributor adapted to be supported at its respective ends in wall-engaging relation to form a trough therewith, said distributor comprising an elongated strip having a depending upstanding flange along one longitudinal edge and a downwardly depending skirt along the other longitudinal edge, said skirt being provided with closely spaced lateral undulations having lateral wall-engaging portions with shallow lateral concavities therebetween, said concavities being of varying depth ranging from most shallow near the center of said distributor to deepest at its respective ends.

6. The combination with a tank having a vertical plane-surfaced wall of an elongated liquid distributor adapted to be supported at its respective ends in wall-engaging relation to form a trough therewith, said distributor comprising an elongated strip having a depending upstanding flange along one longitudinal edge and a downwardly depending skirt along the other longitudinal edge, said skirt being provided with closely spaced lateral undulations having lateral wall-engaging portions with shallow lateral concavities therebetween, said distributor being resiliently bowed in a manner to urge said skirt into wall engagement throughout its length when the distributor is supported in wall-engaging relation and said concavities being of varying depth ranging from most shallow near the center of said distributor to deepest at its respective ends.

References Cited in the file of this patent

UNITED STATES PATENTS

| | | |
|---|---|---|
| 1,813,050 | Hauk | July 7, 1931 |
| 2,131,423 | Babson | Sept. 27, 1938 |
| 2,138,607 | Larsen | Nov. 29, 1938 |
| 2,576,050 | Soden | Nov. 20, 1951 |
| 2,626,784 | Hansen | Jan. 27, 1953 |
| 2,629,228 | Bergmann | Feb. 24, 1953 |
| 2,691,282 | Snelson | Oct. 12, 1954 |
| 2,713,251 | Cann et al. | July 19, 1955 |